United States Patent
Cooper

(10) Patent No.: US 7,398,224 B2
(45) Date of Patent: Jul. 8, 2008

(54) PERFORMANCE MOTIVATION SYSTEMS AND METHODS FOR CONTACT CENTERS

(75) Inventor: Kim A. Cooper, 715 E. 100 North, Lindon, UT (US) 84042

(73) Assignee: Kim A. Cooper, Lindon, UT (US)

( * ) Notice: Subject to any disclaimer, the term of this patent is extended or adjusted under 35 U.S.C. 154(b) by 408 days.

(21) Appl. No.: 11/115,845

(22) Filed: Apr. 26, 2005

(65) Prior Publication Data

US 2006/0233348 A1 Oct. 19, 2006

Related U.S. Application Data

(60) Provisional application No. 60/663,968, filed on Mar. 22, 2005.

(51) Int. Cl.
*G06F 11/34* (2006.01)
(52) U.S. Cl. .................................................. 705/11
(58) Field of Classification Search .................. 705/8, 705/11; 379/265.12
See application file for complete search history.

(56) References Cited

U.S. PATENT DOCUMENTS

| | | | | |
|---|---|---|---|---|
| 6,067,354 | A * | 5/2000 | Bauer et al. | 379/201.01 |
| 6,614,903 | B1 * | 9/2003 | Flockhart et al. | 379/265.12 |
| 6,700,971 | B1 | 3/2004 | Cohen et al. | |
| 6,707,811 | B2 * | 3/2004 | Greenberg et al. | 370/352 |
| 6,782,093 | B2 | 8/2004 | Uckun | |
| 6,823,315 | B1 | 11/2004 | Bucci et al. | |
| 6,959,078 | B1 | 10/2005 | Eilbacher et al. | |
| 7,023,979 | B1 * | 4/2006 | Wu et al. | 379/265.11 |
| 7,203,655 | B2 * | 4/2007 | Herbert et al. | 705/11 |
| 2001/0056367 | A1 | 12/2001 | Herbert et al. | |
| 2002/0046110 | A1 | 4/2002 | Gallagher | |
| 2003/0004790 | A1 | 1/2003 | Calderaro et al. | |
| 2003/0004847 | A1 | 1/2003 | Calderaro et al. | |
| 2003/0200144 | A1 | 10/2003 | Antonucci et al. | |
| 2003/0233278 | A1 | 12/2003 | Marshall | |
| 2004/0177138 | A1 | 9/2004 | Salle et al. | |
| 2004/0202308 | A1 | 10/2004 | Baggenstoss et al. | |
| 2004/0202309 | A1 | 10/2004 | Baggenstoss et al. | |

(Continued)

OTHER PUBLICATIONS

McPhail "Actual and Ideal: Practices and pitfalls of performance management and electronic performance measurement in call centers", Feb. 2004, Faculty of Information Studies University of Toronto, pp. 1-59.*

(Continued)

*Primary Examiner*—Romain Jeanty
(74) *Attorney, Agent, or Firm*—Bryan G. Pratt; Rader Fishman & Grauer PLLC

(57) ABSTRACT

An embodiment of a system for optimizing agent performance includes a listener subsystem configured to acquire statistics from at least one contact center data source, and an application subsystem configured to receive said statistics from said listener subsystem. The application subsystem is further to calculate performance metrics based on the statistics, associate the performance metrics with a scorecard, and transmit data representative of the scorecard to a client for real-time presentation of the scorecard for consideration by a user using the client. The scorecard includes the performance metrics. The system is configured in a service-oriented architecture. In some embodiments, web services are used to acquire the statistics from the contact center data source.

24 Claims, 8 Drawing Sheets

U.S. PATENT DOCUMENTS

| | | | |
|---|---|---|---|
| 2004/0210475 | A1 | 10/2004 | Starnes et al. |
| 2004/0220852 | A1 | 11/2004 | Posey |
| 2004/0243428 | A1 | 12/2004 | Black et al. |
| 2004/0248070 | A1 | 12/2004 | Ancier |

OTHER PUBLICATIONS

Baker "Incentives Contracts and Performance Measurement", 1992, Journal of Political Economy, vol. 100 No. 3, pp. 598-614.*

Christopher et al (The Choice of Performance Measures in Annual Bonus Contracts), Apr. 1997, The Accounting Review, pp. 231-255.*

Nguyen et al "Agent Platform Evaluation and Comparison", Jun. 2002, pp. 1-15.*

Workstream Completes Acquisition of Bravanta to Strengthen Compensation Offerings; Transaction Completes End-to-End Incentive and Recognition Solution, Business Wire, Jul. 28, 2004, Workstream Inc; Bravanta Inc. pp. 1.

Workstream Signs Definitive Agreement to Acquire Bravanta, Business Wire, Jun. 30, 2004, Workstream Inc; Bravanta Inc. pp. 1.

Onyx and Concerto Software Announce Partnership; Companies to Promote Benefits of Linking CIM and CRM, Business Wire, Jun. 2, 2004, Onyx Software Corp; Concerto Software Inc. pp. 1.

Softscape Acquires the Nelson Group; Launches Management Consulting & Organizational Development Division, Business Wire, May 18, 2004, Softscape Inc; Nelson Group, pp. 1.

Time America and CORT Directions Partner to Integrate Time and Attendance with HRMS Solution, Business Wire, Apr. 1, 2004, Time America Inc; Cort Directions Inc, pp. 1.

Ceridian Forms Agreement with Softscape to Deliver Employee Performance and Development Solutions, Business Wire, Feb. 24, 2004, Ceridian Corp; Softscape Inc, pp. 1.

Name Change Helps API Software, Inc. Better Communicate Its Commitment to the Healthcare Industry; New Name, but Still Same Leading Technology from Wisconsin Vendor, Business Wire, Feb. 4, 2004, API Software Inc; Automating Peripherals Inc, pp. 1.

Blue Pumpkin Acquires Onward, Inc. Division to Boost Workforce Optimization Services, PR Newswire, Sep. 23, 2002, Blue Pumpkin Software; Onward Technologies Inc, pp. 1.

Hands-off management, San Francisco Business Times, v16n13, Nov. 2, 2001, Periodical, ISSN 0890-0337, pp. 17.

Sunrise Growers Selects Kronos to Match Workforce to Seasonal Demands, Business Wire, Feb. 22, 2005, Kronos Inc; Sunrise Growers Inc.

Angel.Com Announces Availability of 'Virtual Call Center', PRNewswire, MicroStrategy Inc, Virginia, RCNAUSA.

Synygy Grows Revenue, Profit, and Cash in 2004 to Achieve 14th Record Year; Synygy Ends the Year with Nearly 500 Employees Globally, Business Wire, Feb. 1, 2005, Synygy Inc, Conshoohocken, PA.; RCNAUSA.

Frost & Sullivan Names Blue Pumpkin as Recipient of 2004 Product Differentiation Innovation Award, Business Wire, Dec. 15, 2004, Frost Blue Pumpkin Software Inc; Blue Pumpkin Advisor Express, Pao Alto, CA; RCNAUSA.

Unitime Systems Introduces Incentive Trackin Feature for ITs Automated Timekeeping System, Business Wire, Dec. 1, 2004, UniTime Systems Inc, Boulder, CO; RCNAUSA.

Workstream to Showcase Rewards Offerings at Motivation Tradeshow, Business Wire, Sep. 28, 2004, Workstream Inc, Chicago; RCNAUSA.

Online Performance Incentives. (In short)(Brief Article)(Product Announcement), Information Week, Jan. 22, 2001, BeyondWork Inc, Product Introduction, Copyright 2001 CMP Media, Inc, ISSN 8750-6874, pp. 109.

Balanced Scorecard Collaborative honors pbviews Customer, Media General, With Prestigious Hall of Fame Award, PR Newswire, Oct. 21, 2004, pp NA.

Balanced Scorecard Collaborative Honors Canon, Chrysler, Cognos, Media General, and Motorola with Prestigious Hall of Fame Award; Breakthrough Performance REsults Lauded at North American Summit, PR Newswire, Oct. 13, 2004, pp NA.

CorVu Launches Industry's Most Comprehensive Performance Management Application, PR Newsire, Oct. 19, 2004, Minnesota; RCNAUSA.

Mark W. Morgan. Customer-Focused Scorecards: Measuring the Right Things. See pp. 1-49.

* cited by examiner

Fig. 6A

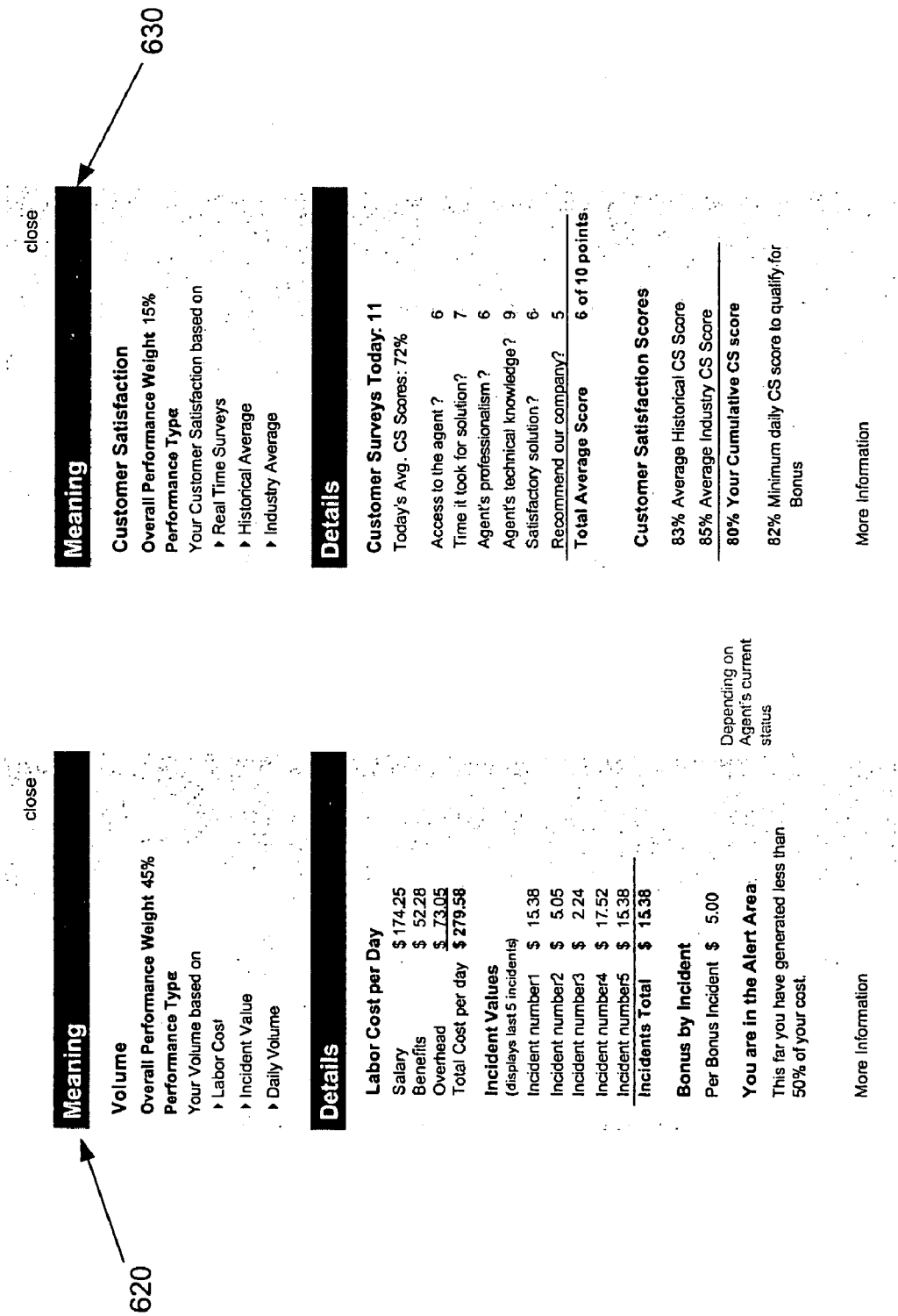

PERFORMANCE MOTIVATION SYSTEMS AND METHODS FOR CONTACT CENTERS

RELATED APPLICATIONS

The present application claims priority under 35 U.S.C. §119(e) to U.S. Provisional Patent Application Ser. No. 60/663,968, by Kim A. Cooper, filed on Mar. 22, 2005, and entitled "Systems and Methods for Optimizing Agent Performance," the contents of which are hereby incorporated by reference in their entirety.

The present application is also related to a utility patent application entitled "A Graphical Tool, System, and Method for Visualizing Agent Performance," by Kim A. Cooper, filed concurrently herewith, the contents of which are hereby incorporated by reference in their entirety.

BACKGROUND

It is not uncommon for businesses to expend significant amounts of money and resources to maximize the performance of employees. This is especially true for employees who may impact the reputation of a business by dealing directly with its customers. For example, many businesses operate or contract customer service centers (e.g., call centers) to provide services to customers. The customer service centers typically employ agents to interface with customers and/or potential customers by way of telephone calls, e-mail messages, or other forms of communication. Because of the direct communication between customer service agents and customers, the agents are in positions that may significantly influence the reputation of a business. Consequently, customer service centers spend significant efforts to train their agents to provide effective and timely customer service.

The skill, training, motivation, and performance of call center agents are significant factors that contribute to the success of a call center. In particular, the profitability of a call center is influenced by the quality of customer service provided by agents, as well as by the volume of interactions handled by the agents. Unfortunately, many agents are unaware of the extent to which they influence the success of a call center. Specifically, agents are typically unaware of the real-time performance levels required to cover the overhead and profit margins of the call center.

Many technologies have been introduced to help call centers succeed. Examples of such technologies include automated computer systems designed to track statistics of call centers. For example, call analytics such as the number of calls handled, the lengths of the calls, the number of incidents resolved, and the average time to handle incidents are typically tracked by call center systems. These statistics have typically been used by managers to analyze the performance of the call center. For example, managers often use the statistics in periodic performance reviews to help train call agents.

Other technologies have been introduced for using call center statistics to monitor and report the performance of agents. Some such technologies are even designed to provide agents with variable compensation based on the performance levels of the agents. This is intended to motivate the agents to improve their performance levels in order to increase their payouts.

While existing performance management technologies may have helped to automate some performance management tasks, there remains room for improvement. For example, existing performance management technologies are costly. One significant cost of existing technologies results from the difficulties involved in integrating the technologies with existing call center systems. Call center systems typically use a wide variety of native computing platforms, languages, and protocols. Consequently, existing performance management technologies have traditionally required significant investment for integration with call center systems, as well as for maintenance of the integrated technologies. The costs are often significant enough to dissuade small and medium-size call centers from making such an investment.

Moreover, many call centers are reluctant to provide full access to their computing systems, especially when trade secrets and industry know-how are contained in the systems. This poses a significant problem because significant access is required to integrate existing performance management technologies with call center systems.

Because of the difficulties, costs, and complexities involved in the integration of existing performance management technologies, manual entry of call center statistics is still widely used. For example, a call center typically includes several different computing tools for tracking and recording call center statistics. Because the computing tools are often implemented in different computing languages and platforms, many existing performance management technologies cannot be practicably interfaced with all of the different computing tools used in all call centers. As a result, many call centers rely upon manual entry of some statistics for use in existing performance management technologies. Manual entry introduces delays and errors into performance management, thereby preventing real-time performance-based motivation.

Another shortcoming of existing performance management technologies can be described as an inability to maximally motivate agents. In particular, several existing technologies seek to motivate agents by informing them of their performances. While this may help motivate agents to increase performance to some degree, these technologies do not maximize the value that may be provided by agents because the agents are not informed of their performances in a manner that encourages self-motivation to add value to the call center. For example, agents may be informed of their performance statistics (e.g., call volume), but the performance statistics are typically provided in a manner that leaves the agents uninformed as to how their performances immediately affect the success of the call center. To illustrate, agents are not typically informed as to how their performances relate to the overhead, profitability margins, and financial success of a call center. Agents left unaware of their values to the call center typically fall short of consistently adding value to the call center. Thus, existing technologies do not provide performance measurements in a manner that encourages maximum self-motivation among agents.

The above-described shortcomings of existing performance management technologies are highlighted by the continuously high attrition rate of call center agents. Even when call centers provide competitive salaries and traditional performance motivators, call center agents continue to experience high turnover rates. Consequently, call centers are forced to spend additional money to recruit and train new agents. The recruitment and training of rookie agents requires significant expenditures that erode profitability.

At least part of the high turnover rates may be attributable to the failure of call centers and existing technologies to focus on the satisfaction and self-motivation of agents. The attention of many existing call centers has been so focused on pleasing customers or motivating agents through variable compensation and peer comparison that existing performance management technologies have failed to consider the importance associated with providing agents with fulfillment, self-motivation, and satisfaction in a manner that also promotes the attainment of the goals of call centers. More specifically, traditional performance management tools have failed to inform agents of their value to the call center. The traditional tools have also failed to instill in agents the self-motivation to add value to and work for the success of a call center. Consequently, high attrition rates among agents have continued and even increased over the last few years.

SUMMARY

An embodiment of a system for optimizing agent performance includes a listener subsystem configured to acquire statistics from at least one contact center data source, and an application subsystem configured to receive said statistics from said listener subsystem. The application subsystem is further configured to calculate performance metrics based on the statistics, associate the performance metrics with a scorecard, and transmit data representative of the scorecard to a client for real-time presentation of the scorecard for consideration by a user using the client. The scorecard includes the performance metrics. The system is configured in a service-oriented architecture. In some embodiments, web services are used to acquire the statistics from the contact center data source.

BRIEF DESCRIPTION OF THE DRAWINGS

The accompanying drawings illustrate various embodiments of the present methods and systems and are a part of the specification. Together with the following description, the drawings demonstrate and explain the principles of the present methods and systems. The illustrated embodiments are examples of the present methods and systems and do not limit the scope thereof.

FIG. 6A is an illustration of the agent view of FIG. 5 and an explanatory window pane displayed adjacent to the agent view, accordingly to an exemplary embodiment.

FIG. 6B is an illustration of another explanatory window pane, accordingly to an exemplary embodiment.

FIG. 6C is an illustration of yet another explanatory window pane, accordingly to an exemplary embodiment.

Throughout the drawings, identical reference numbers designate similar, but not necessarily identical, elements.

DETAILED DESCRIPTION

Figure 1:
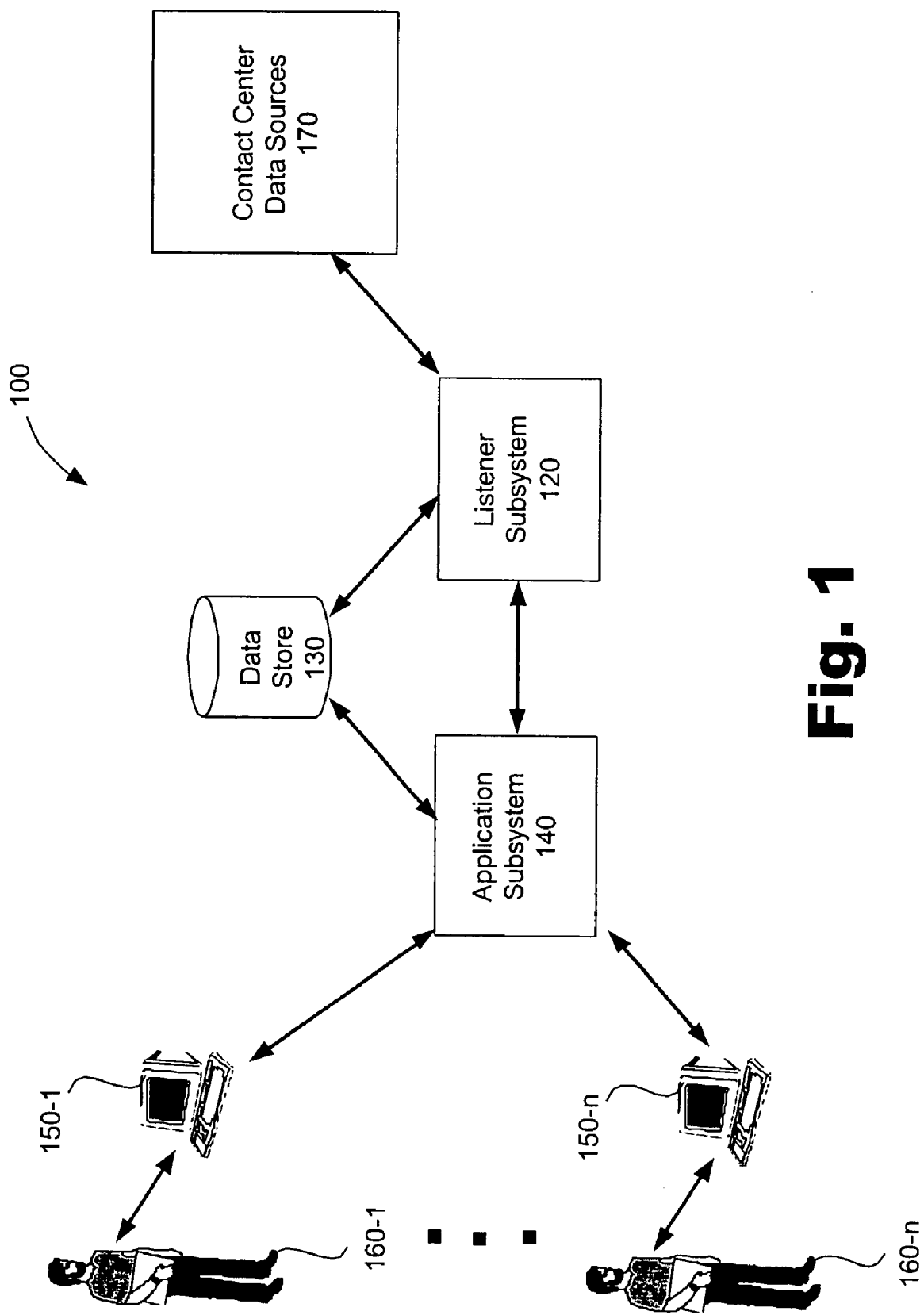
FIG. 1 is a block diagram illustrating a performance motivation system for contact centers, according to an exemplary embodiment.

The present specification describes methods and systems for providing visual performance motivation. More specifically, the present systems and methods use service-oriented architecture to acquire statistics from contact center data sources, calculate performance metrics based on the statistics, and present the performance metrics on clients for consideration by users of the clients. The performance metrics are presented in real time. The performance metrics and other information presented to users are designed to motivate the users to maximize their performances. The present systems and methods may use web services to connect to the contact center data sources.

In the present specification and in the appended claims, the term "service-oriented architecture" is meant to be understood broadly as a software architecture providing loosely coupled, highly interoperable services to connected computing devices. Service-oriented architectures are able to make computing resources available to connected computing devices as independent services that may be accessed in a standardized way. Service-oriented architectures allow services to be provided regardless of the platform or technology of a computing device requesting the services. Service-oriented architectures allow services to interface with the computing devices in a lightweight and non-invasive manner, which makes the present systems and methods easy to interface with contact center applications. Further, the lightweight configuration of the present systems and methods reduces implementation, maintenance, and support costs associated with interfacing with contact center applications. Many service-oriented architectures utilize web services technology.

The term "web services" is meant to be understood as any mechanism(s) for connecting computing applications regardless of the technology, location, and platform of the applications. With web services, computing applications can dynamically interact with other computing applications using one or more standardized communications protocols (e.g., XML, SOAP, HTTP, WSDL, and/or UDDI). Web services are able to provide added-value services to connected computer programs with reduced or no manual input. Web services may allow computing applications on a hosted server to be made available for use by connected users or computer programs. Web services usually include some combination of computer programming and data, but may include human resources as well. As known to those skilled in the art, web services are not limited to web-based connections and may be used to loosely couple computing applications across a wide variety of different connections, including but not limited to local area network, wide area networks, the Internet, and other known types of connections.

The term "incident" is meant to be understood as a communication instance being processed by a contact center. The incidents are typically handled by contact center agents. In the case of a call center, for example, a telephone call handled by an agent may be referred to as an incident.

The term "agent" meant to be understood broadly as any person or entity participating in the handling of contact center incidents, including employees and independent contractors. In the case of a call center, for example, an agent may handle a telephone call by communicating with another party (e.g., a customer or potential customer) to resolve any questions or concerns, collect survey information, or solicit a sale or contribution.

In the following description, for purposes of explanation, numerous specific details are set forth in order to provide a thorough understanding of the present methods and systems for motivating agent performance. It will be apparent, however, to one skilled in the art that the present methods and systems may be practiced without these specific details. Reference in the specification to "one embodiment" or "an embodiment" means that a particular feature, structure, or characteristic described in connection with the embodiment is included in at least one embodiment. The appearances of the phrase "in one embodiment" in various places in the specification do not all necessarily refer to the same embodiment.

I. Exemplary System Elements

FIG. 1 is a block diagram illustrating a performance motivation system (100) (or simply "the system (100)") for contact centers, according to one exemplary embodiment. The system (100) may be configured in a service-oriented architecture and may be implemented as software instructions, or other forms of computing instructions, on one or more computer-readable mediums. The instructions may be configured to direct operations of one or more computing devices (e.g., one or more servers). In many embodiments, the system (100) is implemented as a hosted application operating on one or more web servers (not shown).

As illustrated in FIG. 1, the system (100) includes a listener subsystem (120), a data store (130), and an application subsystem (140). The application subsystem (140) is communicatively coupled to clients (150-1 through 150-n) (collectively "the clients (150)"). The clients (150) are accessible to users (160-1 through 160-n) (collectively "the users (160)"). The listener subsystem (120) is communicatively coupled to contact center data sources (170). The listener subsystem (120) may be configured to acquire information, including contact center statistics, from the contact center data sources (170) and to store at least a subset of the acquired information in the data store (130). Alternatively, the listener subsystem (120) may send the acquired information to the application subsystem (140), which can store at least a subset of the acquired information in the data store (130). The application subsystem (140) is configured to access, retrieve, and aggregate information stored in the data store (130). The application subsystem (140) may use the retrieved information to calculate agent performance metrics. The agent performance metrics and other information may be processed and sent to the clients (150) in a form suitable for being presented for consideration by the users (160). Each of these elements will now be described in more detail.

A. Contact Center Data Sources

The contact center data sources (170) may include any tools and technologies useful for operating a contact center, including but not limited to computer-automated applications for directing incoming messages (e.g., incoming telephone calls, chat messages, or e-mail messages) to appropriate agents, recognizing input (e.g., voice or dual-tone multi-frequency ("DTMF") inputs), managing customer relationships (e.g., customer relationship management ("CRM") tools), storing and accessing data, tracking billing and accounting functions, calculating agent expenses (e.g., overhead), calculating contact center profitability margins, tracking human resources information, etc. The contact center data source (170) may include any known technology for monitoring statistics associated with the call center, including statistics related to call analytics, incidents, agent activity, incoming and outgoing communications, lengths of time spent handling incidents, call transfers, call resolution, customer feedback data, expenses, schedule compliance, peer reviews, certifications, etc. The contact center data sources (170) may be configured to operate with various types of contact centers, including customer service centers and call centers. The contact center data sources (170) maybe configured to process any suitable form of communication, including e-mail messages, chat messages, telephone calls, and other known forms of communication.

As known to those skilled in the art, contact center data sources (170) may be configured to collect and store statistics (sometimes referred to as "silo data") related to the operation of the contact center. As discussed below, the statistics may be made available to the application subsystem (140) for use in calculating agent performance metrics. In many embodiments, the contact center data sources (170) are loosely coupled to one or more components of the system (100) by way of service-oriented architecture such that the system (100) may conveniently interface with and provide services to the contact center data sources. By using a service-oriented architecture to be loosely coupled to the call center data sources (170), the system (100) can be implemented to operate on top of contact center data sources (170) and other contact center applications. This allows easy and non-invasive interfacing of the system (100) with contact center data sources (170) of many different platforms and technologies, which makes the system (100) easy to interface with contact center applications. Further, the lightweight configuration of the system (100) reduces implementation, maintenance, and support costs associated with interfacing with contact center applications.

B. Users

The users (160) are typically human beings who can utilize the clients (150) to interface with the application subsystem (140). However, the users (160) may be other living organisms, automated agents, or forms of intelligence technology configured to provide input to and/or consider output from the system (100). The users (160) may be assigned different roles having particular privileges with the system (100). For example, the users (160) may be assigned roles such as agent, team leader, manager, and administrator. An agent may be given privileges for accessing agent-specific information and screens, while a team leader may be given privileges for accessing team-specific information, including information associated with any agent of the team. Administrators and/or managers may be given full administrative privileges, including privileges for configuring the settings of the system (100). When a particular user (160) logs into the system (100), the system (100) is able to present appropriate user interfaces to the user (160) based on the role and privileges assigned to the user (160).

C. Clients

The clients (150) may include any devices physically accessible to the users (160) and that allow the users (160) to provide input to, receive information from, or otherwise access the system (100). For example, the clients (150) may include, but are not limited to, desktop computers, laptop computers, workstations, personal data assistants, cellular telephones, satellite pagers, wireless internet devices, embedded computers, video phones, network interface cards, mainframe computers, mini-computers, programmable logic devices, vehicles, entertainment devices, gaming devices, and other future devices that may not yet currently exist. The clients (150) may include various peripherals such as a terminal, keyboard, mouse, screen, printer, stylus, input device, output device, or any other apparatus that can help relay information between the users (160) and the application subsystem (140).

Each of the clients (150) typically includes instructions that may be executed by a processor (not shown) to enable communication with the application subsystem (140). The instructions may be in any computer-readable format, including software, firmware, microcode, and the like. In one embodiment, the clients (150) are equipped to communicate with the application subsystem (140) over a network such as the Internet (not shown in FIG. 1). Any known connection may be used to connect the clients (150) with the application subsystem (140), including secure web services connections.

The clients (150) may be equipped to operate web browsers, including known web browsers such as Internet Explorer®. Through web browsers, the users (160) are able to access the functionality of the system (100). In particular, the web browsers are able to forward requests for information to the application subsystem (140), as well as display any retrieved information for viewing by the users (160). Several exemplary graphical views provided by the system (100) for presentation on the clients (150) will be described further below.

Although not shown in FIG. 1, the clients (150) may be connected to the contact center data sources (170) for purposes of contact center operations. For example, the clients (150) may comprise agent workstations running contact center software programs such as those designed to assist agents in the routing and handling of contact center incidents (e.g., customer calls and requests). Accordingly, the contact center data sources (170) may be able to monitor activity occurring on the clients (150). As discussed below, the system (100) is able to acquire and utilize monitored contact center information (e.g., performance statistics) to motivate agent performance.

D. Listener Subsystem

The listener subsystem (120) may be configured to acquire information from the contact center data sources (170). Any information made available by the contact center data sources (170) may be acquired by the listener subsystem (120), including any of the statistics described above.

In some embodiments, the listener subsystem (120) may be configured to remotely acquire information from the contact center data sources (170). For example, the listener subsystem (120) is capable of acquiring information over a network (e.g., the Internet) or other known connection by listening for predefined events associated with the contact center data sources (170). In some embodiments, the listener subsystem (120) is configured to receive information from the contact center data sources (170) using web services. In other words, the information may be acquired in a web services protocol format. Accordingly, contact center data sources (170) are able to make information available simply by converting it to a web services protocol format for transmission to the listener subsystem (120).

In other embodiments, the listener subsystem (120) may form an integral part of, or at least be proximate to, the contact center data sources (170). Accordingly, the listener subsystem (120) and the contact center data sources (170) may be connected by any known local connections. Exemplary remote and integral implementations of the listener subsystem (120) will be described further below.

The listener subsystem (170) may save some or all of the acquired data to the data store (130) for later use by the system (100). Preferably, the listener subsystem (120) is able to acquire and store information in real time, or at least in substantially real time.

E. Data Store

The data store (130) may comprise one or more storage mediums or devices, including databases. The data store (130) may employ any type and form of storage media known to those skilled in the art. The data store (130) may be configured to store predefined data, as well as information acquired by the listener subsystem (120). The information may include any of the information acquired by the listener subsystem (120), as discussed above. The predefined data may include information predefined by an administrator or manager. For example, the data store (130) may include information representative of performance goals and thresholds, rewards, reward thresholds, reward codes, agent costs, overhead costs, profitability margins, agent statuses, team statuses, bonus information, bonus thresholds, perks, perk thresholds, money generated by agents, contest rules, agent identifiers, agent information (e.g., direct deposit information), performance metric heuristics, and any other information that may be used to motivate agent performance.

The data store (130) may also store configuration data for the system (100), including data provided through administrative functions of the system (100). For example, stored administrative data may include agent profiles, company profiles, team profiles, task assignments, and any other type of configuration information.

The data store (130) may include predefined back-up settings that may be configured for use when up-to-date information acquired by the listener subsystem (120) is unavailable. For example, if the connection between the listener subsystem (120) and the application subsystem (140) or data store (130) is temporarily unavailable, the system (100) may use the predefined settings as a back-up to the real-time acquired information. Administrators may define the settings based on historic performance levels or other factors useful for estimating actual performance statistics.

The data store (130) may include any known technologies useful for storing and accessing information. For example, the data store (130) may include structured query language ("SQL") technologies, including an SQL or MySQL server. The data store (130) may include one or more databases, which may be in the form of relational databases.

F. Application Subsystem

The application subsystem (140) is configured to receive information obtained by the listener subsystem (120). The information may be obtained directly from the listener subsystem (120) or from the data store (130). In some embodiments, the application subsystem (140) uses web services to receive information from the listener subsystem (120).

The application subsystem (140) is able to search for and retrieve information from the data store (130). The application subsystem (140) can include or communicate with a search server (e.g., an SQL server) configured to search the information in the data store (130). Accordingly, the application subsystem (140) is able to identify at least a subset of the information in the data store (130), based on a search request.

The application subsystem (140) includes predefined instructions and logic capable of formatting, organizing, aggregating, and otherwise processing information retrieved from the data store (130). In particular, the application subsystem (140) is configured to organize and provide formatted information to the clients (150) in a manner that can be presented to the users (160). For example, the application subsystem (140) may be configured to use information (e.g., agent statistics) retrieved from the data store (130) to calculate agent performance metrics. The performance metrics include information depicting the performance levels of agents, based on information acquired by the listener subsystem (120). The performance metrics may further include performance thresholds and rewards that are provided when agent performance levels reach the performance thresholds. Performance information, rewards, and the relationship between the performance information and the rewards may be presented to agents in real-time so that the agents are able to consider the immediate consequences of their performances. In other words, the performance metrics may be presented as a real-time visual gauge that depicts the immediate consequences of agent performance. In accordance with principles of behavioral science, the awareness of immediate consequences tends to facilitate agent self-motivation, which encourages to maximized performance.

The application subsystem (140) may associate the performance metrics with agent scorecards, which may be sent to the clients (150) for presentation to the users (160). The agent scorecards may be presented to the users (160) in graphical form. In some embodiments, for example, the application subsystem (140) is implemented on one or more web servers configured to send web pages containing the agent scorecards to the client device (150). The client device (150) may display the web pages to the user (160) using a web browser or other suitable application, as discussed above. An exemplary embodiment of an agent scorecard will be described in detail below.

The application subsystem (140) may be implemented as a web services application, or group of web services applications, running on one or more web servers. In an exemplary embodiment, the application subsystem (140) is implemented in the form of a ".NET" application running on an Internet information server, as will be understood to those skilled in the art. By using web services, the system (100) is able to acquire and provide real-time up-to-date information for presentation on the clients (150). Contact center data source (170) of many different technologies and computing platforms can be easily expanded to interface with the listener subsystem (120) and the application subsystem (140) by providing data in web services protocol formats. Thus, the use of web services provides a platform-independant interface with the system (100) so that many different types and configurations of contact center data source (170) may be conveniently and cost-effectively interfaced with the system (100). The use of web services reduces, or even eliminates, manual entry of contact center statistics, thereby providing automatic acquisition of a wide range of statistics that may be used to motivate agent performance.

The application subsystem (140) may be configured to present information to the client device (150) in real time so that users (160) are able to view up-to-date performance information (e.g., performance metrics). The information may be transmitted to the clients (150) in any suitable format, including hypertext markup language ("HTML"). With real-time information being displayed by the clients (150), users (160) are able to know immediately, or at least nearly immediately, their statuses with respect to current performance levels, bonuses, rewards, value to the call center, current activity, incentives being offered, agent overhead costs, profit margins, and any other information helpful for motivating the user (160) to perform by providing immediate feedback as to how the current performance of the user (160) adds value and qualifies for rewards. Again, the indication of immediate consequences tends to facilitate agent self-motivation, which encourages maximized performance.

II. Exemplary System Implementations

Figure 2:
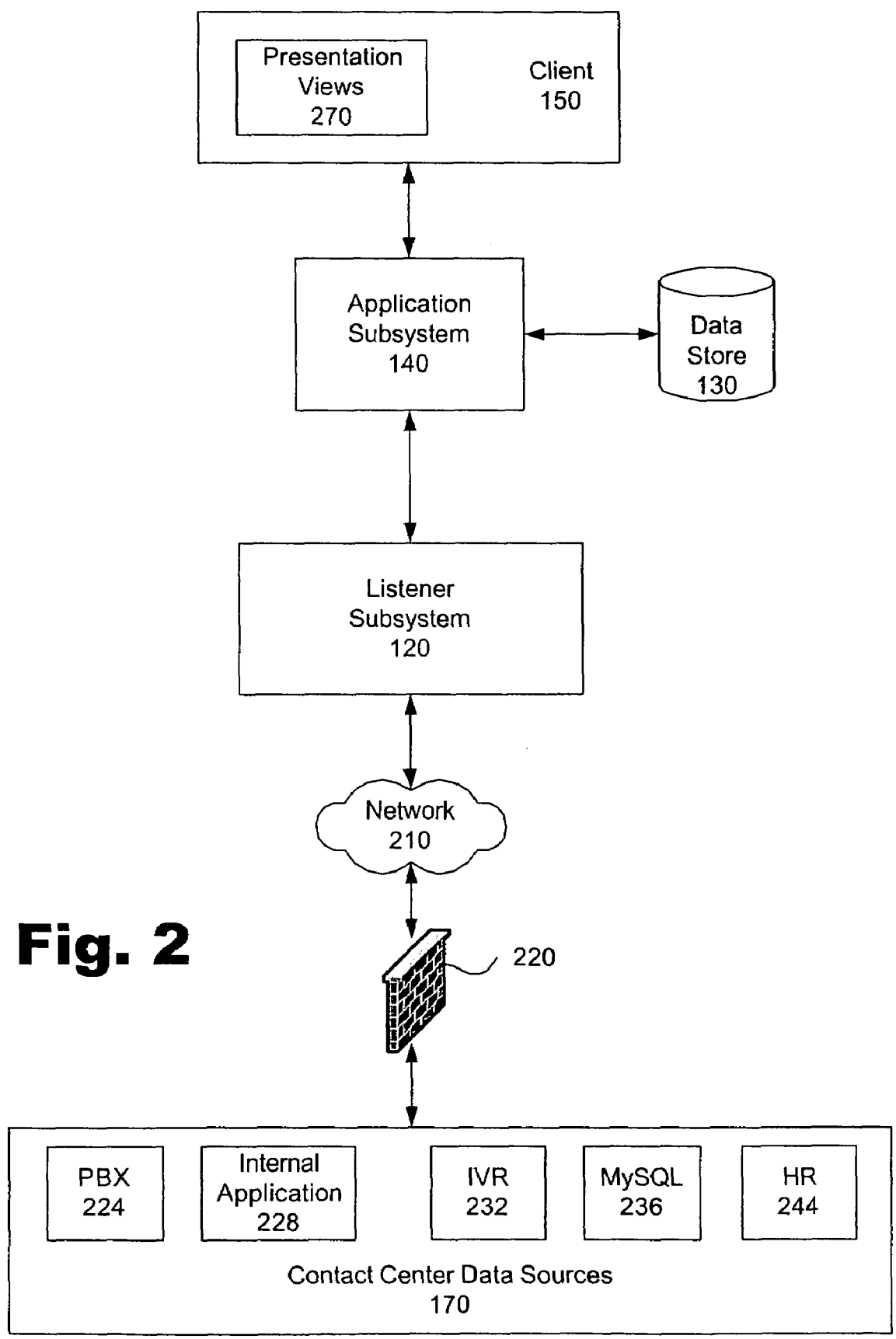
FIG. 2 is a block diagram illustrating an example of a hosted implementation of the system of FIG. 1, according to an exemplary embodiment.
Figure 3:
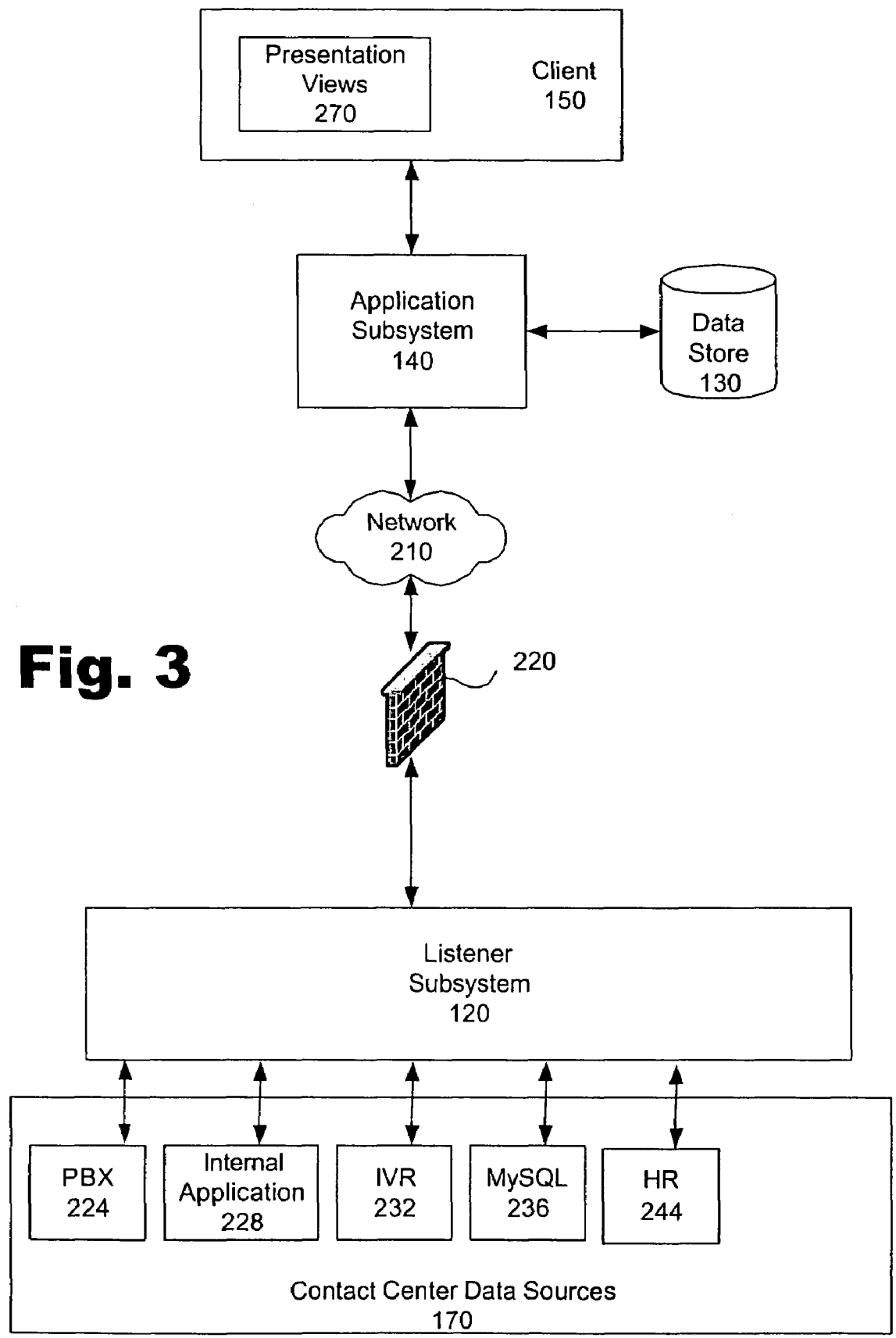
FIG. 3 is a block diagram illustrating an example of an enterprise implementation of the system of FIG. 1, according to an exemplary embodiment.

The system (100) may be implemented in a wide variety of different service-oriented configurations, including hosted configurations and enterprise configurations. FIGS. 2 and 3 are a block diagrams illustrating examples of hosted and enterprise implementations of the system (100), according to exemplary embodiments.

A. Exemplary Hosted Implementation

In FIG. 2, the system (100) is implemented in a hosted configuration in which the listener subsystem (120) is configured to remotely acquire information from the contact center data sources (170). As shown in FIG. 2, the listener subsystem (120) may be connected to the contact center data sources (170) through a network (210) and a firewall (220). The network (210) may comprise the Internet, and the firewall (220) may be in the form of any firewall known to those skilled in the art. While FIG. 2 shows the network (210) connecting the listener subsystem (120) and the contact center data sources (170), any known suitable connection (e.g., web services connections) may be used.

The listener subsystem (120) is able to receive contact center statistics over the network (210) using a secure connection such as a virtual private network ("VPN") connection or hypertext transport protocol ("HTTP") connection. In many exemplary embodiments, web services connections are used to connect the listener subsystem (120) with the contact center data sources (170).

In the configuration shown in FIG. 2, data sources in the contact center data sources (170) are preferably accessible from the network (210) in a manner that exposes contact center data for acquisition by the listener subsystem (120). For example, the data sources may be configured or expanded to provide data in web services protocol format. With each data source being configured to expose data for retrieval by web services applications, the listener subsystem (140) may be easily and inexpensively interfaced with the contact center data sources (170). Accordingly, the system (100) provides a cost-effective upgrade to already deployed contact center data sources (170).

FIG. 2 illustrates several possible contact center data sources (170), including a public branch exchange ("PBX") (224), an internal application (228), an interactive voice recognition ("IVR") application (232), MySQL technology (236), and a human resources application (244), each of which is known to those of ordinary skill in the art. The contact center data sources (170) may also include other data sources, including but not limited to call analytics servers, chat and e-mail servers, and customer relationship management ("CRM") servers. The data sources preferably expose their data to the listener subsystem (120) such that the data can be monitored and acquired over the network (210). For example, the human resources application (244) may include information about the expenses of a contact center, including expenses attributable to particular agents for calculations of overhead and profitability margins. The expenses data may be exposed to the listener subsystem (120).

In the implementation shown in FIG. 2, the listener subsystem (120) is configured to forward the acquired contact center data to the application subsystem (140), which may store the data in the data store (130). As discussed above, the application subsystem (140) may be configured to retrieve information from the data store (130), use the retrieved data to generate agent performance metrics, associate the metrics with an agent scorecard, and send the scorecard to the client (150) for presentation to a user (160). The application subsystem (140) may send the scorecard to the client (150) over a network, such as the Internet, using secure web services connections.

The client (150) is configured to present the information (e.g., the scorecard) received from the application subsystem (140) for viewing by the user (160). As shown in FIG. 2, the client (150) may include or generate presentation views (270) that may be displayed on the client (150). The presentation views (270) may be in the form of visual displays, including but not limited to graphical user interfaces ("GUIs"). The presentation views (270) may be of many different formats and may include information dynamically selected for display based on criteria associated with the particular user (160)

associated with the client (150). For example, the presentation views (270) may include an agent view for agents, or a team view for team managers. The presentation views (270) may include the agent scorecard and other information generated by the application subsystem (140). Several exemplary presentation views (270) and associated information contained therein will be discussed in greater detail below.

B. Exemplary Enterprise Implementation

The system (100) may be implemented in an enterprise configuration. In FIG. 3, the system (100) is implemented in an enterprise configuration in which the listener subsystem (120) is integrated within the contact center data sources (170). More specifically, the listener subsystem (120) is implemented behind the firewall (220) as part of the network of a contact center. This allows the listener subsystem (120) to acquire data from the contact center data sources using the data access interfaces natively provided by the data sources. Accordingly, data sources do not have to be modified to provide data access interfaces for directly exposing data to a remote application. Instead, the listener subsystem (120) may provide a loosely coupled interface with the data sources of the contact center data sources (170).

Figure 4:
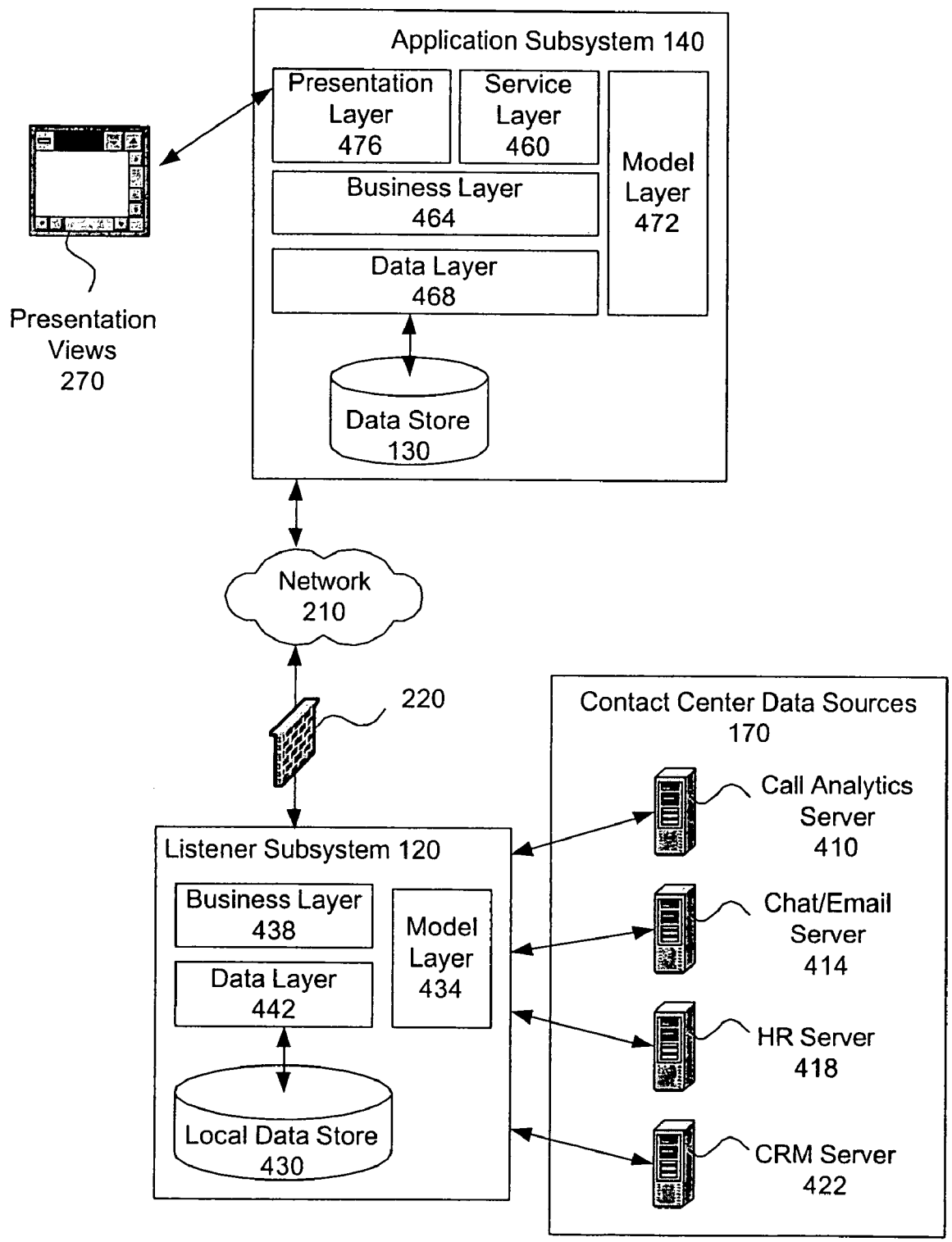
FIG. 4 is a block diagram illustrating a detailed example of the enterprise implementation of FIG. 3, according to an exemplary embodiment.

The listener subsystem (120) may acquire data and store the acquired data in a local data store (see FIG. 4; 430). The listener subsystem (120) may forward the acquired data over the network (210) to the application subsystem (140). In many exemplary embodiments, a web services connection is used to transmit the data from the listener subsystem (120) to the application subsystem (140). Accordingly, the listener subsystem (120) may be configured to package the acquired data in a web services protocol format (e.g., SOAP format) for transmission to the application subsystem (140), which may be configured for interpreting data received in web services protocol formats. The application subsystem (140), data store (130), and client (150) may function as described above to generate performance metrics from the gathered data (e.g., statistics) and to present the performance metrics in presentation views (270) for consideration by the users (160).

FIG. 4 is a block diagram illustrating a detailed example of the enterprise implementation of the system (100) as shown FIG. 3, according to an exemplary embodiment. Other embodiments and implementations of the system (100) may also include the layers shown in FIG. 4. As shown in FIG. 4, the listener subsystem (120) may be integrally configured as part of the contact center data sources (170). As discussed above, the listener subsystem (120) may acquire data from contact center data sources of the contact center data sources (170). FIG. 4 illustrates several exemplary contact center data sources, including a call analytics server (410), a chat/e-mail server (414), a human resources server (418), and a customer relationship management ("CRM") server (422), which are well-known to those skilled in the art.

The listener subsystem (120) may include a local data store (430) to which the acquired data may be stored. The local data store (430) may include any suitable technologies and media for storing and accessing data. The local data store (430) allows the listener subsystem (120) to maintain the acquired data in case the connection with the application subsystem (140) is unavailable. The data may then be transferred when the connection becomes available.

The listener subsystem (120) may include a model layer (434), a business layer (438), and a data layer (442). The model layer (434), business layer (438), and data layer (442) may be in the form of software instructions configured to provide an interface with the local data store (430). For example, the data layer (442) may include data objects configured to call predefined procedures for storing, accessing, searching, retrieving, deleting, and performing other functions on data associated with the local data store (430).

The data layer (442) may be configured to interface with the business layer (438) and the model layer (434). Accordingly, the business layer (438) and the model layer (434) may access the local data store (430) through the data layer (442). The business layer (438) and/or the model layer (434) may operate on data retrieved from the local data store (430) or acquired directly from the contact center data sources to convert the data into any format suitable for transmission to the application subsystem (140), including web services formats. For example, the acquired data may be converted to extensible markup language ("XML") web services formats such as simple object access protocol ("SOAP") and web services description language ("WSDL"). Of course, other web services protocols may be used, including universal description discovery and integration ("UDDI") protocol.

The application subsystem (140) includes several layers for processing data received from the listener subsystem (120) and for communicating with the clients (150). As shown in FIG. 4, the application subsystem (140) may include a service layer (460), a business layer (464), a data layer (468), a model layer (472), and a presentation layer (476). The layers exchange data between them, and each layer is typically responsible for the performance of one or more tasks. The layers may be in the form of software instructions.

In general, the service layer (460) and the presentation layer (476) can make requests to the business layer (464), which processes the requests. The business layer (464) may access the model layer (472) to provide temporary state objects that may be passed to the data layer (468). The business layer (464) may also access the data layer (468), which may request data store (130) operations parameterized by data from the model layer (472). The data layer (468) may then respond to the business layer (464) by forwarding data. The business layer (464) may perform predefined operations on the data and respond by forwarding the results of the processing to the presentation layer (476) and the service layer (460). The presentation layer (476) and the service layer (460) are able to forward the results to the clients (150). Each of the layers of the application subsystem (140) will now be described in detail.

1. Service Layer

The service layer (460) is configured to provide application subsystem (140) interfaces with the listener subsystem (120) and the clients (150). For example, the service layer (460) may be configured to interpret data received from the listener subsystem (120). In particular, the service layer (460) may be configured to unpack data that is in web-services protocol format (e.g., SOAP format). The service layer (460) may then forward the unpacked data to the business layer (464) for further processing. The service layer (460) may provide a coarse-grained or fine-grained interface to the business layer (464), as will be understood by those skilled in the art.

The service layer (460) may invoke predefined web services processes to provide web services interfaces with the clients (150). For example, the service layer (460) may invoke web services processes in response to requests for updating agent statistics, adding users, and deleting users, just to name a few. With respect to a process for updating agent statistics, for example, the service layer (460) may respond to a request from a particular client (150) for updated agent performance metrics by accessing sub-layer processes for accessing the requested information in the data store (130). For example, the service layer (460) may call a business layer (464) process for updating agent statistics. The business layer (464) may function as described below to obtain and return the requested information to the service layer (460).

2. Business Layer

The business layer (464) is configured to perform business logic functions. More specifically, the business layer (464) may include class libraries configured to model business logic used to generate the presentation views (FIG. 2; 270). For example, the business layer (464) may include predefined instructions for calculating agent performance metrics and generating agent scorecards containing the performance metrics. The calculations may be based on data retrieved from the data store (130).

The business layer (464) is configured to interface with the data layer (468) to access the data store (130). More specifically, the business layer (464) may call data layer processes that are configured to return data objects to the business layer (464). The business layer (464) may then use the data objects to perform business logic calculations. The business layer (464) may be configured to request retrieval of agent statistics, team statistics, agent statuses, performance leaders, agent scorecard data, agent bonuses, agent contests, security information, configuration information, and any other information stored in the data store (130).

The business layer (464) may include instructions for calculating performance metrics for agent scorecards. For example, a scorecard module may be configured to calculate volume, customer service, quality, and performance scores for particular agents. A volume score may refer to the number of incidents handled by an agent. This number may be the current number handled or the number handled per a given period of time. A customer service score may refer to the average score given by customers as part of a customer satisfaction feedback survey. A quality score may be calculated based on a number of predefined weighted factors, including but not limited to adherence to a work schedule, fulfillment of certification requirements, and peer ratings. A performance score may be an overall agent score calculated from other scores. For example, the performance score may factor in volume, customer service, and quality scores.

The scorecard module may be configured to calculate the monetary value added by an agent to the contact center. This value may be based on the overhead cost and/or profit margin associated with the agent. Overhead cost may refer to an amount of monetary outlays associated with the employment or contracting of the agent. For example, wages, benefits, equipment costs, lease of premises space, and other well-known expenses may be used to calculate the overhead costs associated with agents. The amount of overhead costs may be calculated from data provided by the contact center data sources (170). More specifically, expense data may be pulled from human resource databases. Profit margin may refer to a predetermined per-agent profitability goal for the contact center.

The value added by an agent may be calculated by subtracting liabilities from the income generated by the agent. Income may be based on incidents handled by the agent. For example, each incident may be pre-assigned a particular monetary value. As an agent handles incidents, their values are summed. Liabilities (e.g., overhead costs or profitability margin) may be subtracted from the sum to determine the current value (positive or negative) generated by the agent.

The business layer (464) may be configured to compare agent performance metrics with predetermined performance thresholds to determine the status of agent performance. For example, any particular measure of performance may be compared with a threshold to determine whether an agent qualifies for a bonus, reward, contest prize, and/or perk. The business layer (464) is able to determine when agents have qualified for incentives, generate a notification, and submit the notification to the presentation layer (476) to transmission to the clients (FIG. 1; 150), as described below. Further, the business layer (464) may include an illustration of performance in relation to a threshold in an agent scorecard. Agent bonus status may be stored and tracked using the data store (130).

The business layer (464) may be configured to aggregate various types and amounts of data retrieved from the data store (130). Aggregations may be calculated continually or periodically based on the frequency of updates. Aggregate data may be stored in the data store (130).

The business layer (464) may forward generated results (e.g., calculated scores or scorecards) to the presentation layer (476) and/or the service layer (460) for transmission to the clients (FIG. 1; 150). The results may be presented to users (160) in real time in the presentation views (270), as discussed below.

3. Data Layer

The data layer (468) moves data between the business layer (464) and the data store (130). In other words, the data layer (468) provides access to the data store (130). As mentioned above, the business layer (464) may access the data layer (468) by calling data layer processes, which allows the business layer (464) to read data from and write data to the data store (130).

The data layer (468) may include data access class libraries, data tables, and stored processes. A data access application block may include helper classes that provide an interface for calling the stored processes. The data layer (468) may utilize known memory interface processes and technologies to provide access to the data store (130).

4. Model Layer

The model layer (472) includes model layer data objects configured to represent data instances or groups of data instances contained in the data store (130). For example, the model layer (472) may include representations that model participants and rules of business processes. The model layer (472) provides a level of abstraction on top of the data layer (468). The model layer (472) is typically stateless and may be populated by the business layer (464) with data obtained from the data layer (468).

The model layer (472) may include and use class libraries to model actors, tasks, and performance measurements associated with contact centers. Merely by way of example, the model layer (472) may include objects for modeling agents, team leaders, administrators, agent performance scores, agent statistics, agent bonuses, agent contests, agent schedules (planned and actual), authorization, teams, team statistics, team performance scores, incidents, tasks, companies, expenses, customer satisfaction surveys, configuration information, and any other contributors to the business logic of the contact center data sources (170).

5. Presentation Layer

The presentation layer (476) may be configured to format and transmit data to the clients (FIG. 1; 150) for presentation in the presentation views (270). The data may be rendered to the clients (FIG. 1; 150) in the form of HTML, which may be presented to the users (FIG. 1; 160) using a web browser. The presentation layer (476) may include and use web pages, controls, and configuration files to render the presentation views (270). Agent scorecards may be configured for inclusion in particular presentation views (270). Exemplary presentation views (270) will be described further below.

The presentation layer (476) is able to receive and process requests from the clients (FIG. 1; 150). Typically, the presentation layer (476) sends the request to the business layer (464) for additional processing. The business layer (464) can function as described above to respond to requests from the presentation layer (476).

III. Exemplary Presentation Views

The application subsystem (140) may be configured to provide data representative of various forms of presentation views (270) to the clients (FIG. 1; 150) for presentation to the users (FIG. 1; 160). The data may be transmitted to the clients (FIG. 1; 150) in any suitable format, including HTML pages. The application subsystem (140) may include various predefined page templates for use in forming a variety of presentation views (270).

The various forms of presentation views (270) may be divided into categories of views. For example, the presentation views (270) may include, but are not limited to, agent views, team views, administrative views, and reports. The application subsystem (140) may make different categories of views available to particular user roles based on access privileges. For example, agent views may be presented to users (FIG. 1; 160) having agent roles, team views may be accessible by users (FIG. 1; 160) having team leader roles, and administrative views may be accessible by users (FIG. 1; 160) having administrative roles. When a particular user (FIG. 1; 160) logs into the system (100), the role assigned to the user (160) may be identified, and an appropriate view will be presented to the user (160).

Figure 5:
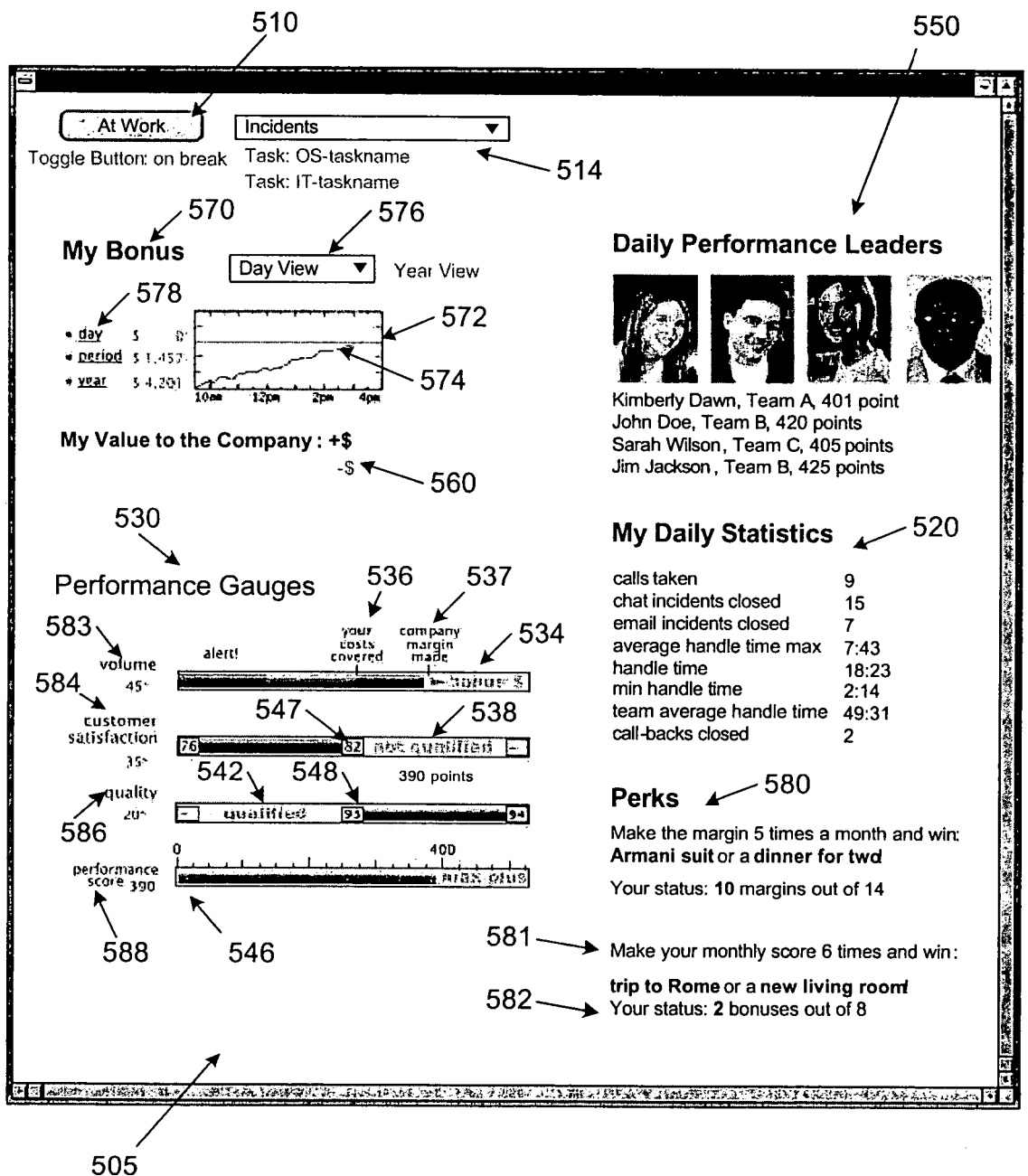
FIG. 5 is an illustration of an example of an agent view provided by the system of FIG. 1, according to one exemplary embodiment.

FIG. 5 is an illustration of an agent view (500) provided by the system (100), according to one exemplary embodiment. The agent view (500) may include a wide variety of information useful to agents, including performance metrics (505) and other information that tends to facilitate self-motivated agents. Performance metrics (505) may refer to any information that tends to indicate performance levels of agents. As shown in FIG. 5, the agent view (500) may include an agent status indicator (510), which indicates the current activity (e.g., working or on a break) of the associated agent. The agent status indicator (510) may be in the form of a toggle button that allows the agent to select his or her status.

The agent view (500) may include a task indicator (514), which indicates the type of task being worked on by the agent. The task indicator (514) may be in the form of a drop-down menu allowing the agent to select from a list of predefined tasks. Examples of agent tasks may include, but are not limited to, incidents, operating system ("OS") tasks, and information technology ("IT") tasks. The agent may use the task indicator (514) to select the type of task that he or she will perform.

The agent view (500) may list daily statistics (520) produced by the agent. As shown in FIG. 5, examples of daily statistics (520) for the agent may include the number of calls taken, the number of chat incidents closed (i.e., resolved), the number of e-mail incidents closed, the average incident handle time, the handle time for the current incident, the minimum handle time recorded by the agent, the team average handle time, and the number of callbacks closed. The list of daily statistics (520) provides the agent a detailed overview of his or her performance for the day so far.

The agent view (500) may include performance gauges (530). One or more performance gauges (530) may be included to graphically illustrate the performance of an agent with respect to predefined or dynamically determined thresholds. For example, a volume gauge (534) may visually indicate a volume score produced by the agent. The volume score of the agent may be presented in reference to a volume threshold (536) associated with volume that is sufficient to cover the costs (e.g., overhead) of the agent. A margin threshold (537) may also be presented to enable a visual comparison between the volume score of an agent and the volume score associated with covering the predefined profitability margin of the contact center.

By presenting agent performance information with respect to thresholds associated with the overhead of the agent and the contact center profitability margin, agents are informed of their real-time value to the contact center. In particular, agents can see the immediate value produced by the current volume of incidents handled. Agents are able to quickly determine whether their current performance has covered his or her costs and whether the current performance has made or exceeded the profitability margin. Consequently, agents are assisted in being motivated to meet predefined contact center goals. The knowledge of performing at a level that adds value to the contact center also tends to encourage self-motivation, and self-motivated agents are most likely to maximize their performance levels. The information displayed in the agent view (500) encourages immediate self-motivation and does so in a manner that brings agent motivation into line with the financial goals of the contact center by encouraging an ownership mentality.

Moreover, the volume gauge (534) indicates what volume levels will equate to bonuses for the agent. As shown in FIG. 5, when an agent surpasses the contact center margin threshold (537), the agent earns bonuses, which may be in the form of monetary payouts.

Other performance gauges (530) may also be included in the agent view (500). For example, FIG. 5 illustrates a customer satisfaction gauge (538), a quality gauge (542), and an overall performance score gauge (546). The customer satisfaction gauge (538) graphically indicates the current customer satisfaction score of the agent. The customer satisfaction score may be calculated by the application subsystem (FIG. 1; 140) based on customer survey data collected by the contact center data sources (FIG. 1; 170).

As shown in FIG. 5, the customer satisfaction score may be indicated with reference to a predetermined customer satisfaction threshold (547). When the score reaches the threshold (547), the customer satisfaction gauge (538) may visually indicate (e.g., change color) that the agent has reached the threshold (547). The customer satisfaction gauge (538) may be configured to start from the customer satisfaction score of the previous day and adjust according to survey data received in the current day.

The quality gauge (542) graphically indicates the current quality score of an agent. Quality scores may be based on adherence to schedule, agent certifications, and peer ratings. A minimum quality threshold (548) may be displayed to indicate the minimum quality score to be reached to qualify an agent for bonuses.

The overall performance gauge (546) graphically indicates the current overall performance score of the agent. The customer satisfaction score may be calculated by the application subsystem (FIG. 1; 140) based on aggregated performance scores associated with the performance of the agent. For example, overall performance scores may take into account volume scores, customer satisfaction scores, quality scores, and any other suitable performance measurement scores. The different scores used to calculate an overall performance score may be weighted according to a predetermined ratio. For example, the agent view (500) includes an indication that the overall performance score may comprise a scoring ratio of forty-five percent volume score, thirty-five percent customer satisfaction score, and twenty percent quality score.

The system (100) may use the overall performance scores of agents to identify performance leaders. FIG. 5 illustrates the presentation of daily performance leaders (550). In particular, specific agents having the highest overall performance scores are listed, along with their respective teams and scores. Photographs of the agents may also be displayed. The presentation of daily performance leaders (550) allows agents to compare their performances with those of the leaders. Peer comparison with top performing agents may help motivate agents to work to improve their performances.

The list of daily performance leaders (550) may be updated hourly. During the first hour of a shift, placeholders may be displayed until sufficient data is gathered to identify performance leaders.

The agent view (500) may present the value of an agent to the contact center (560). As shown in FIG. 5, the value to the contact center (560) may be displayed as a positive or negative monetary amount. The value to the contact center (560) indicates whether the agent is performing at a level that is making money or losing money for the contact center. The amount may be calculated as described above. By displaying the agent's value to the contact center (560), the system (100) encourages the agent to be self-motivated to work at a performance level that adds value to the contact center. Accordingly, agents are motivated to add value in excess of their overhead costs.

The agent view (500) may present a bonus view (570). As shown in FIG. 5, the bonus view (570) may include a graph showing a bonus threshold (572) and the performance of an agent (574) with respect to the bonus threshold (572). Agents may choose from a selection of different bonus graphs, such as graphs that cover different time periods (e.g., yearly or daily). The bonus view (570) may include a drop-down menu (576) that can be used to select from the different graphs. The bonus view (570) may also present bonus payout overviews (578). In particular, the bonus view (570) may show the amounts of bonuses paid out over a day, year, or other time period. The bonus view (570) provides financial incentives to motivate agents based on real-time performance levels. Thus, immediate consequences are displayed to provide an intuitive and motivation visual illustration of how performance immediately affects payout and value to the contact center.

The agent view (500) may present perks information (580). Perks may be rewards that agents can win based on predetermined performance criteria. For example, FIG. 5 shows perks in the form of a new suit, a dinner for two, a trip, or a new living room. New perks may be indicated visually. For example, an exclamation point or other visual symbol may be used to indicate that a perk is new (e.g., not yet two weeks old).

The perks information (580) typically includes predetermined criteria (581) for an agent to receive a perk and a status (582) of the agent for satisfying the criteria. For example, FIG. 5 shows an agent having reached the contact center margin (537) ten times out of a perk criterion of fourteen times.

Once an agent has satisfied the criteria for a perk, the agent view (500) may update to display a congratulations message. A reward code may also be displayed. The agent can use the reward code to collect the perk. The performance thresholds for the performance gauges (530) may be predefined by users (160) having administrative roles.

Figure 6A:
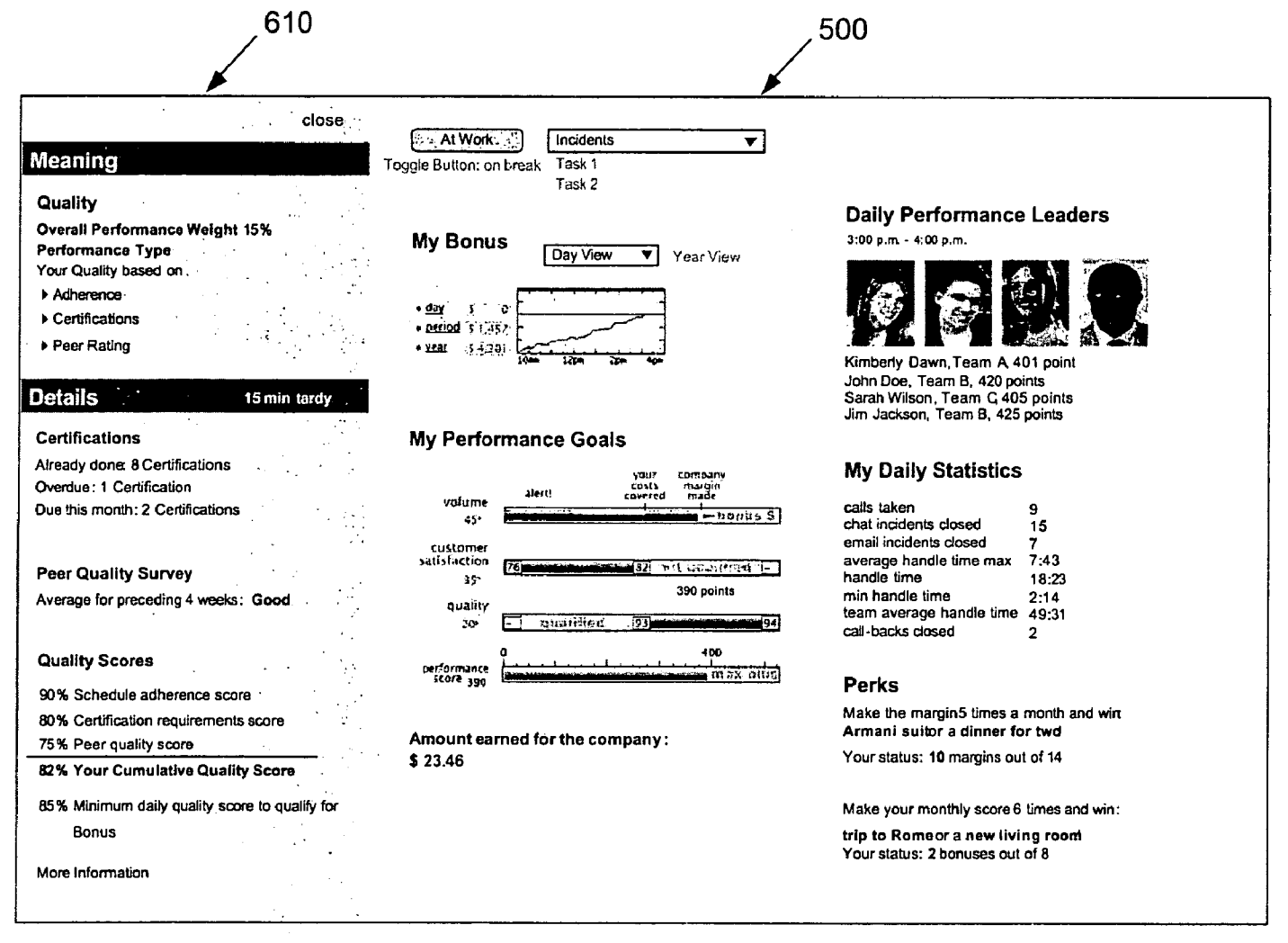

The agent view (500) may include links to additional information. For example, links (583, 584, 586, and 588) can be selected by agents to view additional information about volume, customer satisfaction, quality, and overall performance, respectively. The selection of one of the links (582, 584, 586, or 588) may cause a corresponding window pane to be presented to the agent, without directing the user (FIG. 1; 160) away from the agent view (500). In particular, a new window pane may be opened adjacent to the agent view (500), as shown in FIG. 6A. FIG. 6A illustrates the agent view (500) and a particular window pane (610) displayed adjacent to the agent view (500). The window pane (610) includes detailed information about the definition of quality and the factors and agent statistics used to calculate quality scores. The content of the window pane (610), as well as the factors used to calculate quality scores, may be preconfigured by users (FIG. 1; 160) having administrative roles.

Similarly, volume, customer satisfaction, and overall performance window panes may be opened by the links (582, 584, and 588). FIG. 6B illustrates an example of a volume window pane (620), and FIG. 6C illustrates an example of a customer satisfaction window pane (630), according to exemplary embodiments. The window panes (620 and 630) may also be opened adjacent to the agent view (500), without directing the user (FIG. 1; 160) away from the agent view (500). Additional window panes may also be configured to provide agents with additional information about any of the information presented in the agent view (500).

The presentation views (FIG. 4; 270) may display information to the user (FIG. 1; 160) in real time. The information is presented in real time to provide immediate feedback and consequences to the users (FIG. 1; 160). In accordance with principles of behavioral science, the users (FIG. 1; 160) are likely to respond to the real-time objective performance and consequences information with self-motivated performance. In general, this helps to encourage maximized productivity of agents handling messages for a call center.

IV. Exemplary Method

Figure 7:
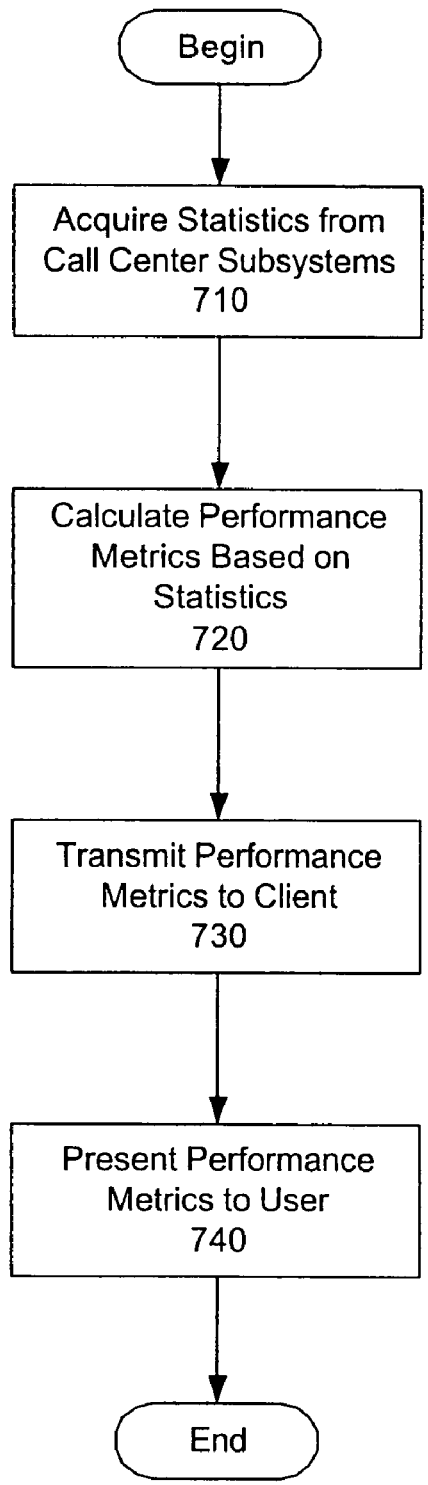
FIG. 7 is a flowchart illustrating a method of providing visual motivation for agent performance using the system of FIG. 1, according to an exemplary embodiment.

FIG. 7 is a flowchart illustrating a method of motivating agent performance using the system (FIG. 1; 100), according to an exemplary embodiment. The method of FIG. 7 begins by acquiring statistics from contact center data sources (FIG. 1; 170) (step 710). This may be performed in any of the ways described above, including by using web services technology.

Performance metrics are calculated based on the acquired statistics (step 720). This may be performed in any of the ways described above, including by using predefined heuristics.

Data representative of the performance metrics is transmitted to a client (FIG. 1; 150) (step 730). This may be performed in any of the ways described above, including by sending data configured to generate a view of an agent scorecard containing the agent performance metrics.

The agent performance metrics are presented in real time for consideration by the user (FIG. 1; 160) using the client (FIG. 1; 150) (step 740). Step 740 may be performed in any of the ways discussed above. The performance metrics may be presented as part of a scorecard in a graphical user interface, such as in the form of the agent view (500) of FIG. 5.

According to one exemplary embodiment, the present systems and methods described above may be implemented as instructions on a computer readable carrier. Program(s) of the computer readable carrier define functions of embodiments and can be contained on a variety of signal-bearing media, which include, but are in no way limited to, information permanently stored on non-writable storage media (e.g., read-only memory devices within a computer such as CD-ROM or DVD-ROM disks readable by a CD-ROM drive or a DVD drive); alterable information stored on writable storage media (e.g., floppy disks within a diskette drive or hard-disk drive or read/writable CD or read/writable DVD); or information conveyed to a computer by a communications medium, such as through a computer or network, including wireless communications. The latter embodiment specifically includes information downloaded over the Internet and other networks. Such signal-bearing media or computer readable carriers, when carrying computer-readable instructions that direct functions of the present systems and methods, represent embodiments of the present systems and methods. In many embodiments, the systems and methods are implemented as software programs configured to instruct operations on one or more server devices.

The preceding description has been presented only to illustrate and describe the present methods and systems. It is not intended to be exhaustive or to limit the present methods and systems to any precise form disclosed. Many modifications and variations are possible in light of the above teaching. For example, while exemplary systems and methods have been described with reference to call center implementations, applications other than call center applications may similarly be interfaced with and utilize the functions of the present systems and methods.

The foregoing embodiments were chosen and described in order to illustrate principles of the methods and systems as well as some practical applications. The preceding description enables others skilled in the art to utilize the methods and systems in various embodiments and with various modifications as are suited to the particular use contemplated. It is intended that the scope of the methods and systems be defined by the following claims.

What is claimed is:

1. A system comprising:
a listener subsystem configured to acquire statistics from at least one contact center data source; and an application subsystem configured to receive said statistics from said listener subsystem, said application subsystem being further configured to calculate performance metrics based on said statistics, associate said performance metrics with a scorecard, and transmit data representative of said scorecard to a client for real-time presentation of said scorecard for consideration by a user using said client, said scorecard including said performance metrics, wherein said system is configured in a service-oriented architecture, the system further comprising a performance threshold, wherein said application subsystem is configured to compare said performance metrics with said performance threshold to determine a status, said status being configured to indicate an immediate consequence of user performance with respect to said performance threshold, associate said performance threshold and said status with said scorecard such that said real-time presentation of said scorecard includes presentation of said performance threshold and said status for consideration by the user, an automatic reward, wherein said application subsystem is configured to automatically provide said automatic reward to the user when said user performance reaches said performance threshold, and said application subsystem being configured to transmit a notification of said automatic reward for real-time presentation to the user.

2. The system of claim 1, wherein said application subsystem is configured to use web services to receive said statistics from said listener subsystem.

3. The system of claim 1, wherein said listener subsystem is configured to use web services to acquire said statistics from the at least one contact center data source.

4. The system of claim 1, wherein said application subsystem is hosted remotely from the at least one contact center data source.

5. The system of claim 1, wherein said listener subsystem is configured to acquire said statistics automatically.

6. The system of claim 5, wherein said application subsystem includes back-up settings, said back-up settings being configured to be used in place of said statistics for calculation of said performance metrics when automatic acquisition of said statistics is unavailable.

7. The system of claim 1, wherein said statistics include call analytics data and call center expense data.

8. The system of claim 1, further comprising a reward code usable for collecting said automatic reward, wherein said application subsystem is configured to transmit said reward code for real-time presentation to the user.

9. The system of claim 1, wherein said automatic reward includes an automatic deposit to an electronic account associated with the user.

10. The system of claim 1, wherein said performance threshold indicates a performance level corresponding with at least one of overhead costs and profitability margin.

11. A method comprising:
acquiring statistics from at least one contact center data source, said statistics being acquired using a service-oriented architecture; calculating performance metrics based on said statistics, transmitting data representative of said performance metrics to a client, presenting said performance metrics in real time for consideration by a user using said client, providing a performance threshold, comparing said performance metrics with said performance threshold to determine a status, associate said performance threshold and said status with a scorecard such that said real-time presentation of said scorecard includes presentation of said performance threshold and said status for consideration by the user, presenting said status in real time for consideration by the user, said status indicating an immediate conseciuence of user performance with respect to said performance threshold, automatically providing a reward to the user when said user performance has reached said performance threshold, and presenting a notification of said reward in real time for consideration by the user.

12. The method of claim 11, wherein said statistics are acquired automatically using web services technology.

13. The method of claim 12, further comprising: providing back-up settings, said back-up settings being configured to be used in place of said statistics; and using said back-up settings when automatic acquisition of said statistics is unavailable.

14. The method of claim 11, further comprising presenting a reward code for consideration by the user, said reward code being usable for collecting said reward.

15. The method of claim 11, wherein said automatically providing includes making an automatic deposit to an electronic account associated with the user.

16. The method of claim 11, wherein said performance threshold indicates a performance level corresponding with overhead costs or profitability margin.

17. The method of claim 11, further comprising presenting a reward and a reward status along with said performance metrics in an objective fashion for immediate consideration by the user.

18. The method of claim 11, wherein said statistics are acquired in simple object access protocol ("SOAP") format.

19. The method of claim 11, wherein said presenting step includes displaying said performance metrics in real time as part of a graphical scorecard.

20. A performance motivation system configured in a service-oriented architecture, the system comprising:

a listener subsystem configured to automatically acquire real-time statistics from at least one contact center data source; and a hosted application subsystem configured to use web services to receive said statistics from said listener subsystem, said application subsystem being further configured to calculate performance metrics based on said statistics, determine a rewards status based on said performance metrics, associate said performance metrics and said rewards status with a scorecard, said subsystem application is further configured to compare said performance metrics with a performance threshold to determine said rewards status, said status being configured to indicate an immediate consequence of user performance with respect to said performance threshold, associate said performance threshold with said scorecard such that said real-time presentation of said scorecard includes presentation of said performance metrics, said performance threshold, and said rewards status for consideration by the user, an automatic reward, wherein said application subsystem is configured to automatically provide said automatic reward to the user when said user performance reaches said performance threshold, said application subsystem being configured to transmit a notification of said automatic reward for real-time presentation to the user, transmit data representative of said scorecard to a client for real-time presentation of said scorecard for consideration by a user using said client, said scorecard including said performance metrics and said rewards status configured to indicate a real-time relationship between said performance metrics and said rewards status, wherein said application subsystem is further configured to automatically provide said automatic reward to the user when said user performance reaches said performance threshold, and to transmit a notification of said automatic reward for real-time presentation to the user.

21. The system of claim 20, further comprising a reward code usable for collecting said automatic reward, wherein said application subsystem is configured to transmit said reward code for real-time presentation to the user.

22. The system of claim 20, wherein said automatic reward includes an automatic deposit to an electronic account associated with the user.

23. The system of claim 20, wherein said performance threshold indicates a performance level corresponding with at least one of overhead costs and profitability margin.

24. The system of claim 23, wherein said statistics includes call center expense data, said application subsystem being configured to calculate said overhead costs based on said call center expense data.

* * * * *

UNITED STATES PATENT AND TRADEMARK OFFICE
CERTIFICATE OF CORRECTION

PATENT NO. : 7,398,224 B2  Page 1 of 1
APPLICATION NO. : 11/115845
DATED : July 8, 2008
INVENTOR(S) : Kim A. Cooper It is certified that error appears in the above-identified patent and that said Letters Patent is hereby corrected as shown below:

Column 20, Line 38, Claim 11, change "an immediate conseciuence of user" to --an immediate consequence of user--

Signed and Sealed this

Twenty-sixth Day of August, 2008

JON W. DUDAS
*Director of the United States Patent and Trademark Office*